(12) United States Patent
Pekelis et al.

(10) Patent No.: US 10,901,872 B2
(45) Date of Patent: Jan. 26, 2021

(54) IMPLEMENTING A RESET POLICY DURING A SEQUENTIAL VARIATION TEST OF CONTENT

(71) Applicant: Optimizely, Inc., San Francisco, CA (US)

(72) Inventors: Leonid Boris Pekelis, San Bruno, CA (US); David Jonathan Max Walsh, San Francisco, CA (US); Ramesh Om Johari, San Francisco, CA (US)

(73) Assignee: Optimizely, Inc., San Francisco, CA (US)

( * ) Notice: Subject to any disclaimer, the term of this patent is extended or adjusted under 35 U.S.C. 154(b) by 0 days.

(21) Appl. No.: 16/752,440

(22) Filed: Jan. 24, 2020

(65) Prior Publication Data

US 2020/0159642 A1    May 21, 2020

Related U.S. Application Data

(63) Continuation of application No. 15/682,163, filed on Aug. 21, 2017, now Pat. No. 10,585,778, which is a continuation of application No. 14/863,310, filed on Sep. 23, 2015, now Pat. No. 9,760,471.

(51) Int. Cl.
*G06F 11/36* (2006.01)
(52) U.S. Cl.
CPC ...... *G06F 11/3612* (2013.01); *G06F 11/3688* (2013.01)
(58) Field of Classification Search
None
See application file for complete search history.

(56) References Cited

U.S. PATENT DOCUMENTS

| | | | |
|---|---|---|---|
| 9,760,471 B2* | 9/2017 | Pekelis | G06F 11/3688 |
| 2006/0143545 A1* | 6/2006 | Reaume | G05B 23/0291 |
| | | | 714/45 |
| 2007/0271352 A1* | 11/2007 | Khopkar | H04L 67/22 |
| | | | 709/217 |
| 2007/0271501 A1* | 11/2007 | Vasilik | G06Q 30/02 |
| | | | 715/234 |
| 2009/0125270 A1* | 5/2009 | O'Shea | G06F 11/263 |
| | | | 702/108 |
| 2014/0020089 A1* | 1/2014 | Perini, II | G07C 9/37 |
| | | | 726/19 |
| 2014/0108640 A1* | 4/2014 | Mathis | H04L 63/1425 |
| | | | 709/224 |

(Continued)

OTHER PUBLICATIONS

Lane, "Introduction to Statistics Online Edition", 2011, Rice University, Published at http://onlinestatbook.com/Online_Statistics_Education.pdf (Year: 2011).*

(Continued)

*Primary Examiner* — Hossain M Morshed
(74) *Attorney, Agent, or Firm* — Womble Bond Dickinson (US) LLP

(57) ABSTRACT

A variation testing system for performing variation testing of content is disclosed. The variation testing system allows an experimenter to continuously monitor the results of the variation test. In order to ensure that the experimenter is provided with valid results, the variation testing system may reset the variation test.

24 Claims, 5 Drawing Sheets

(56) References Cited

U.S. PATENT DOCUMENTS

2014/0372901 A1* 12/2014 Catlin ............... G06Q 30/0251
715/745
2016/0103758 A1* 4/2016 Zhao ................. G06F 8/65
717/124

OTHER PUBLICATIONS

AnyLogic, "AnyLogic Help", 2014 Published by AnyLogic at httpps://help.anylogic.com/index.jsp?topic=%2Fcom.anylogic.help%2Fhtml%2Fanalysis%2FStatistics.html (Year: 2014).

Patel, "What Spending $252,000 on Conversion Rate OptimizationTaught Me", 2012, Published at https://www.quicksprout.com/2012/10/10/08/what-spending-252000-on-conversion-rate-optimization-taught-me/ (Year:2012).

Quality America, "Data Collection, Analysis and Reporting", 2016, Published by Quality America, at http://qualityamerica.com/LSS-Knowledge-Center/qualityimprovementtools/data_collection_analysis_and_reporting.php (year: 2016).

Wingify, "What is A/B Testing?" The Complete Guide to A/B Testing, Aug. 2014, 8 Pages, Can be retrieved at <URL: https://vwo.com/ab-testing/>.

Optimizely, Inc., "What is A/B Testing?" Feb. 2014, 3 pages, Can be retrieved at <URL:https://www.optimizely.com/ab-testing/>.

Sauro,J., "10 Things to Know About A/B Testing," Measuring U, 2012, 6 Pages, Can be retrieved at <URL:http://www.measuringu.com/blog/ab-testing.php>.

Castrounis, A., "How A/B Testing Works (for Non-Mathematicians)," kissmetrics, 2014, 7 Pahes, can be retrieved at <URL:https://blog.kissmetrics.com/how-ab-testing-works/>.

Bartlett, J., "A/B testing-confidence interval for the difference in proportions using R," The Stats Geek, Feb. 15, 2014, 4 pages, Can be retrieved at <URL: http://thestatsgeek.com/2014/02/15/ab-testing-confidence-interval-for-the-difference-in-proportions-using-r>.

Qygard, A., "Rapid A/B-testing with Sequential Analysis", Dec. 25, 2014, 6 Pages, Can be retrieved at <URL: https://www.auduno.com/2014/12/25rapid-a-b-testing-with-sequential-analysis/>.

Pekelis, L., "Statistics for the Internet Age: The Story behind Optimizelys New Stats Engine," Optimizely Blog, Jan. 20, 2015, 11 Pages, can be retrieved at <URL:https://nlog.optimizely.com/2015/01/20/statistics-for-the-internet-age-the-story-behind-optimizelys-new-stats-engine/>.

Office Action for U.S. Appl. No. 14/863,310, dated Jan. 5, 2017, 22 Pages.

\* cited by examiner

IMPLEMENTING A RESET POLICY DURING A SEQUENTIAL VARIATION TEST OF CONTENT

CROSS-REFERENCE TO RELATED APPLICATIONS

This application is a continuation of U.S. patent application Ser. No. 15/682,163, filed on Aug. 21, 2017, which is a continuation of U.S. patent application Ser. No. 14/863,310, filed on Sep. 23, 2015, issued on Sep. 12, 2017 as U.S. Pat. No. 9,760,471, the entire contents of which are incorporated by reference in its entirety.

BACKGROUND

The embodiments described herein pertain in general to conducting controlled, randomized experiments and more particularly to implementing a reset policy during a variation test of content.

Content variation testing is an experiment that tests changes to content against another version of the content. Content variation testing is applied to many different internet services such as electronic-commerce sites to social networks to market places. One example of content variation testing is web page variation testing where an experiment is conducted that tests changes to a web page against another design of the web page. During variation testing of a web page, changes to a web page that produce positive results are determined. The positive results associated with a particular change to a web page validates that the change to the web page should be used.

To obtain valid results in a conventional variation test such as a fixed-horizon variation test, a strict set of guidelines are followed when performing the variation test. The guidelines include setting a minimum detectable effect and sample size in advance to conducting the test, refraining from viewing the results of the variation test prior to the completion of the variation test, and refraining from testing too many goals and variations in the variation test.

However, an experimenter can now continuously monitor the results of a variation test due to the advancement of experimental technology. This poses a problem as conventional variation testing requires that the experimenter refrain from viewing the results until the completion of the variation test. Thus, the experimenter may view invalid results if the experimenter views the results of the variation test before the completion of the variation test and may make decisions based on those invalid results.

BRIEF SUMMARY

The embodiments herein describe a variation testing system for performing variation testing of content. The content undergoing the variation test is associated with multiple variations of the content. Client devices of users that request the content are provided one of the variations of the content.

In one embodiment, the variation testing system allows an experimenter to continuously monitor the results of the variation test. Thus, the experimenter can request the current results of the variation test at any time and the variation testing system provides valid results to the experimenter regardless of when the experimenter requests the results. To ensure that the experimenter is provided with valid results at all times, the variation testing system implements a reset policy that resets the variation test if the difference in observed conversion rates between the variations of the content are not within a confidence interval. The confidence interval is a range of differences in conversion rates that has a high probability of containing the actual difference of conversion rates between the different variations of the content. If the observed difference in conversion rate is outside of the confidence interval, the results of the variation test may be invalid thereby warranting a reset of the variation test.

Features and advantages described in this summary and the following detailed description are not all-inclusive. Many additional features and advantages will be apparent to one of ordinary skill in the art in view of the drawings, specification, and claims hereof.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
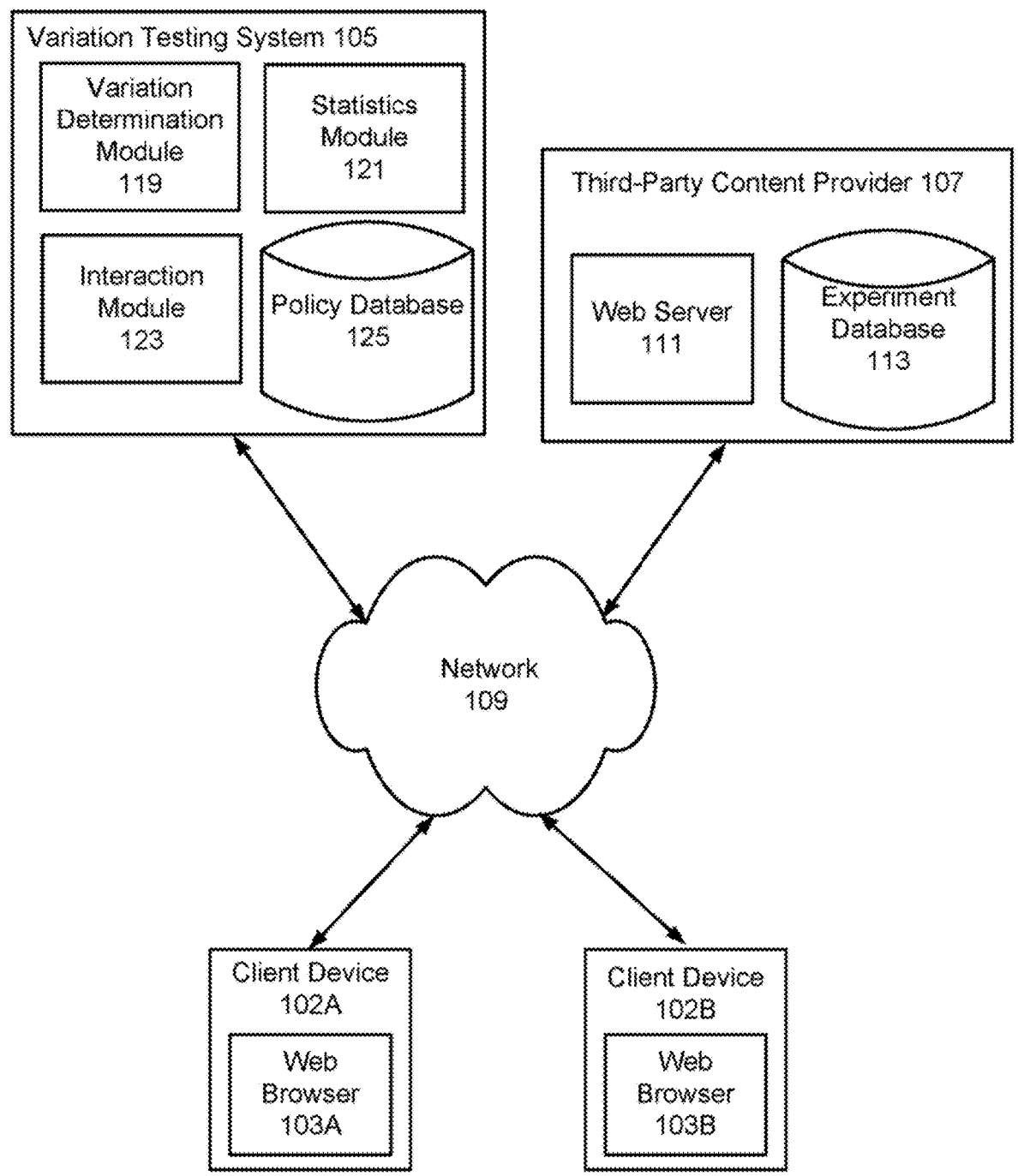
FIG. 1 is a block diagram of a variant testing environment according to one embodiment.

FIG. 1 is a block diagram of a variant testing environment 100 according to one embodiment. Environment 100 includes client devices 102 (e.g., client device 102A and client device 102B). In one embodiment, client device 102A is a device of a first user and client device 102B is a device of a second user. Client device 102A may represent one or more devices of the first user and client device 102B may represent one or more devices of the second user. Client devices 102 are connected to a variation determination system 105 and a third-party content provider 107 via a network 109. Although the environment 100 shown in FIG. 1 only includes two client devices 102, the environment 100 can include any number of client devices (e.g., thousands of client devices 102).

FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

Network 109 enables communication among the entities connected to it. In one embodiment, network 109 is the Internet and uses standard communications technologies and/or protocols. Thus, network 109 can include links using technologies such as Ethernet, 802.11 (WiFi), worldwide interoperability for microwave access (WiMAX), 3G, Long Term Evolution (LTE), digital subscriber line (DSL), asynchronous transfer mode (ATM), InfiniBand, etc. Similarly, the networking protocols used on network 109 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 109 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In one embodiment, network 109 may include but is not limited to any combination of a local area network (LAN), a metropolitan area network (MAN), and a wide area network (WAN). In another embodiment, the entities use custom and/or dedicated data communications technologies instead of, or in addition to, the ones described above.

Client devices 102 communicate with the third-party content provider 107 via the network 109 to receive content items such as web pages from the third-party content provider 107. In one embodiment, each client device 102 is a computer system capable of communicating with the variation determination system 105 and the third-party content provider 107. Examples of client devices 102 include a personal computer, a mobile phone, a tablet, a personal digital assistant (PDA), or a laptop. As shown in FIG. 1, each client device 102 includes a web browser 103 (e.g., web browser 103A and web browser 103B). Web browser 103 is a computer program stored on a client device 102 that allows the user of client 102 to access web pages on the World Wide Web such as web pages provided by the third-party content provider 107. Suitable web browsers include, but are not limited to, GOOGLE CHROME, MICROSOFT INTERNET EXPLORER, MICROSOFT EDGE, MOZILLA FIREFOX, and APPLE SAFARI.

As mentioned above, the environment 100 includes a third-party content provider 107. Hereinafter, the third-party content provider 107 is referred to as a "content provider 107" for ease of description. The content provider 107 may be an individual, a group of individuals, or an entity such as a company. In one embodiment, the content provider 107 provides content items to client devices 102 such as web pages. While only one content provider 107 is shown, it is understood that any number of content providers are supported and can be in the environment 100 at any time.

In one embodiment, the content items provided by the content provider 107 include web pages. However, the content provider 107 may provide other types of content items such as video, audio, a combination of video and audio, still images (e.g., JPEG), text documents, advertisements, and/or any other types of content. For purposes of convenience and the description of one embodiment, the content items provided by the content provider 107 will be referred to as a web pages, but no limitation on the type of content items are intended by this terminology.

In one embodiment, the content provider 107 operates in conjunction with the variation testing system 105 to perform variation tests on web pages. The content provider 107 may display different variations of a web page to client devices 102 based on instructions from the variation testing system 105 that is conducting a variation test on the web page for the content provider 107. A variation test for a web page tests changes to the web page against the current variation of the web page to determine whether the changes produce a desired result. Examples of a desired result do to a change to a web page is an increased selection of an advertisement(s) included in the web page or increased purchases of a product advertised on a web page. Thus, variation testing can validates a new design of a web page or modifications to elements on the web page before the new design or modifications are put into production by the content provider 107.

For a given web page, the content provider 107 may have one or more variations of the web page that are used in a variation test for the web page. In one embodiment, a variation test of a web page involves an experiment that tests an "A" variation known as the control and a "B" variation known as the variant on users requesting the web page from the content provider 107. For ease of discussion, the embodiments discussed herein describe a web page having only two variations: the control and the variant. However, in other embodiments, a web page can have any number of variants.

Figure 2B:
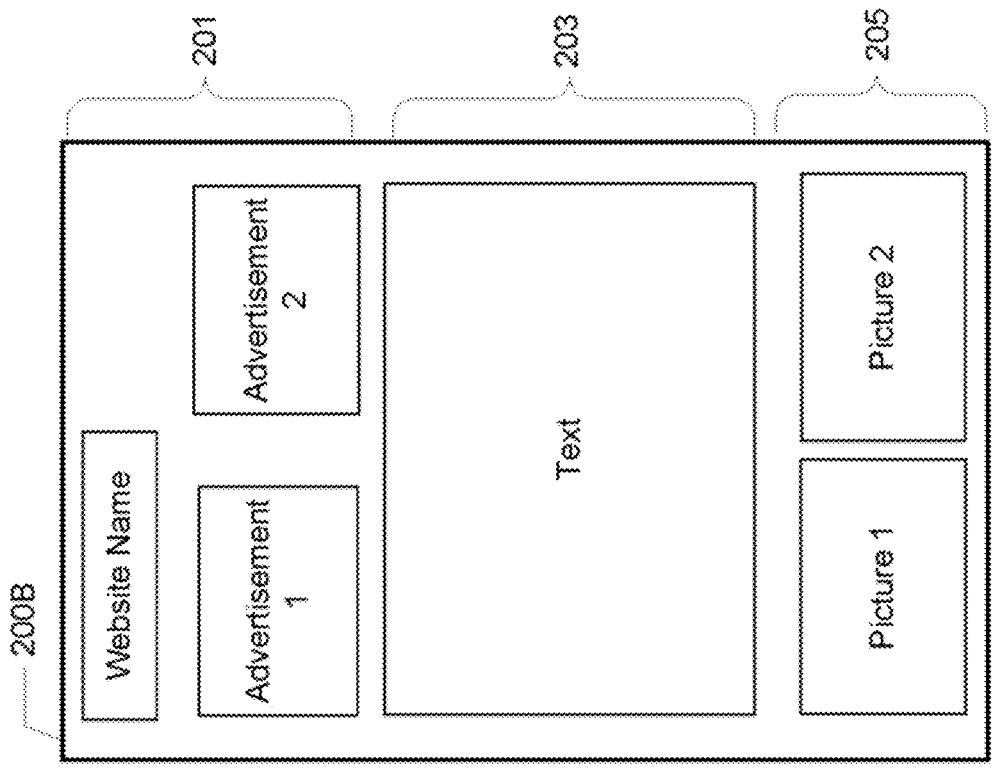
FIGS. 2A and 2B are example variations of a web page according to one embodiment.
Figure 2A:
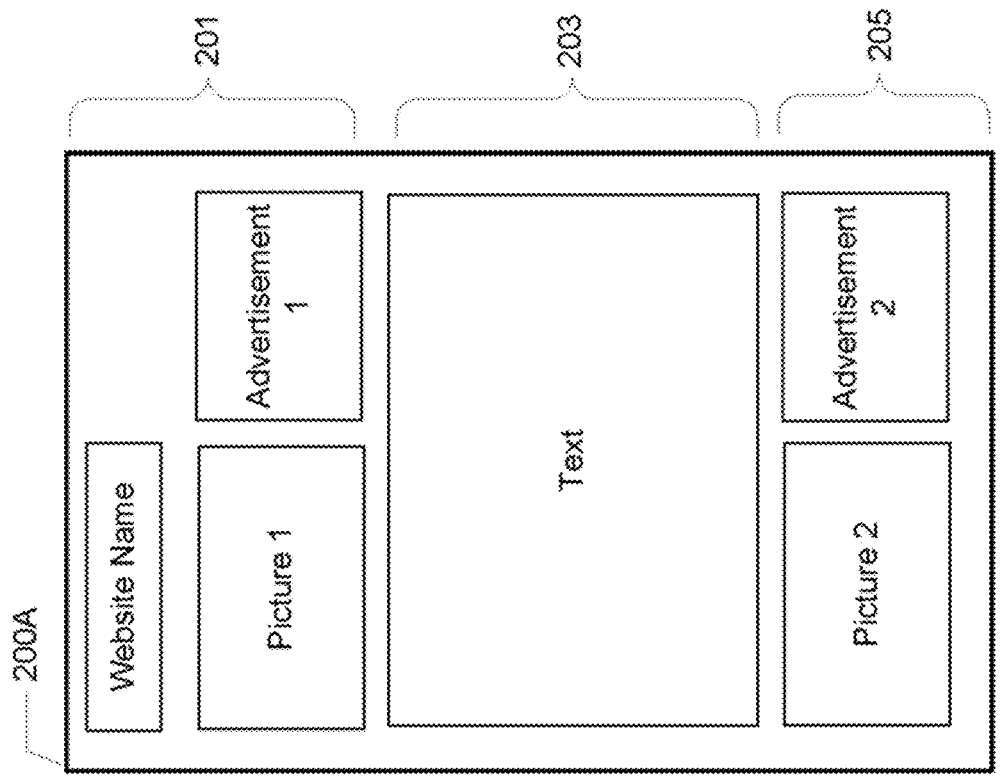

FIG. 2A is an example of an "A" variation (e.g., the control variation) of a web page 200A that represents the current implementation of the web page provided by content provider 107. The control variation of the web page 200A includes a web site name of the website associated with the web page, a first picture, and a first advertisement. The website name, the first picture, and the first advertisement are located in an upper portion 201 of the control variation of web page 200A according to one embodiment. The control variation of web page 200A also includes textual content located in a central portion 203 of the control variation of web page 200A and the control variation of the web page 200A also includes a second picture and a second advertisement located at a lower portion 205 of the control variation of the web page 200A.

FIG. 2B is an example of a "B" variation (e.g., the variant version) of a web page 200B. The variant version of the web page represented by web page 200B includes a modification (i.e., a change) to the control version of the web page 200A shown in FIG. 2A. The variant version of web page 200B includes the website name, a first advertisement, a second advertisement, textual content, a first picture, and a second picture similar to the control version of the web page 200A shown in FIG. 2A. However, the variant version of web page 200B includes the second advertisement positioned in the upper portion 201 of web page 200B whereas the second advertisement is positioned in the lower portion 205 in the control version of the web page 200A. In one embodiment, the variation test using the control version and the variant version of the web page is conducted to determine whether the second advertisement receives more selections (i.e., conversions) when the second advertisement is located at the lower portion 205 of the web page as shown in FIG. 2A or when the second advertisement is located at the upper portion 201 of the web page as shown in FIG. 2B.

Referring back to FIG. 1, in one embodiment the content provider 107 includes a web server 111 and an experiment database 113. In one embodiment, the experiment database 113 stores multiple (i.e., a plurality) variation testing records that describe variation tests conducted by the variation testing system 105 for the content provider 107. Each variation test record is associated with a web page, an experiment identifier that is unique to the variation test, and identifiers of different variations of a web page involved in the variation test. A variation test record may also include a description of the change(s) made to each variation of the web page compared to the control variation of the web page.

In one embodiment, the web server 111 links the content provider 107 to one or more client devices 102 and the variation testing system 105 via the network 109. The web server 111 serves content items such as web pages, as well as other web related content, such as Java, Flash, XML, and so forth. The web server 111 may include a mail server or other messaging functionality for receiving and routing messages between the variation determination system 105 and one or more client devices 102.

The variation testing system 105 conducts variation tests on web pages provided by the content provider 107. As shown in FIG. 1, the variation testing system 105 includes a variation determination module 119, a statistics module 121, an interaction module 123, and a policy database 125. As is known in the art, the term "module" refers to computer program logic utilized to provide the specified functionality. Thus, a module can be implemented in hardware, firmware, and/or software. In one embodiment, program modules are stored on a non-transitory storage device, loaded into a memory, and executed by one or more computer processors of the variation testing system 105. Additionally, those of skill in the art will recognize that other embodiments of the variation testing system 105 shown in FIG. 1 can have different and/or other modules than the ones described here, and that the functionalities can be distributed among the modules in a different manner.

The policy database 125 stores policies for variation tests on web pages being tested by the variation testing system 105. Each policy describes rules associated with the variation test that specify the distribution of the variations of the web page to users such as a percentage of users that should receive a control version of the web page or the variant of the web page. For example, a policy for a web page may specify that half of the users that request the web page receive the control version of the web page and half of the users that request the web page receive the variant of the web page. However, other distributions may be used in other embodiments.

The variation determination module 119 selects a variation of a web page from a plurality of variations of the web page to provide to a client device 102. In one embodiment, the variation determination module 119 receives a request from the content provider 107 to provide instructions indicating which variation of a web page should be provided to a client device 102 that submitted a request for the web page. For example, the variation determination system 105 determines whether to provide the control variation of a web page or the variant variation of the web page to the client 102 responsive to the request. The request from the content provider 107 is an indication to the variation determination system 105 that a web page was requested by a client device 102.

In one embodiment, the variation determination module 119 selects a variation of a web page based on the policy for the variation test of the web page. Responsive to a request from the content provider 107 to provide instructions indicating which variation of a web page should be provided to a client device 102, the variation determination module 119 accesses the policy associated with the web page from the policy database 124. The variation determination module 119 determines from the policy the distribution in which variations of the web page should be provided to users. The variation determination module 119 then assigns the user to a particular variation of the web page (e.g., the control or the variation) according to the determined distribution. For example, if the policy describes a 50/50 distribution of the control version and the variant of the web page, the variation determination module 119 alternates between instructing the content provider 107 to provide the control version or the variation of the web page. Alternatively, the variation determination module 119 randomly assigns users to one of the plurality of variations of the web page.

Once the variation determination module 119 determines which variation of the web page should be provided to the client device 102, the variation determination module 119 transmits a notification to the content provider 107. The notification includes an instruction for the content provider 107 to provide a particular variation of the web page to the client device 102 that requested the web page. The content provider 107 then provides to the client device 102 a baseline web page and instructions (e.g., JavaScript) that describes the different variations to apply to the baseline web page based on the notification sent by the variation testing system 105. The client device 102 executes the instructions associated with the selected variation causing the client device 102 to modify the baseline web page in order to display the variation of the of the web page.

In one embodiment, the interaction module 123 receives indications from the content provider 107 of user interactions with the variations of the web page provided to client devices 102 of users. Each indication specifies whether a conversion occurred on the web page such as the user interacting with second advertisement of web page shown in FIG. 2 or a product advertised on the web page being purchased. In one embodiment, the variation determination module 119 receives the indication of whether a conversion took place from the content provider 107 once the user leaves the web page.

In one embodiment, the statistics module 121 conducts variation tests on web pages. Particularly, the statistics module 121 conducts a sequential test on a web page. However, the sequential test conducted by the statistics module 121 allows an experimenter to continuously monitor the results of the sequential test. That is, an experimenter is allowed to view the results of a sequential test being performed on the web page at any time and the statistics module 121 provides results of the variation test to the experimenter that are valid at all times regardless of when the experimenter requests to view the results.

Note that usage of variation test and sequential test may be used interchangeably herein. Furthermore, in one embodiment an experimenter is a person(s) that represent the content provider 107 that provides the web page undergoing the sequential test such as an employee of the content provider 107. An experimenter may also be a person(s) that represent the variation testing system 105 conducting the sequential test on the web page on behalf of the convent provider 107 such as an employee of the variation testing system 105.

Figure 3:
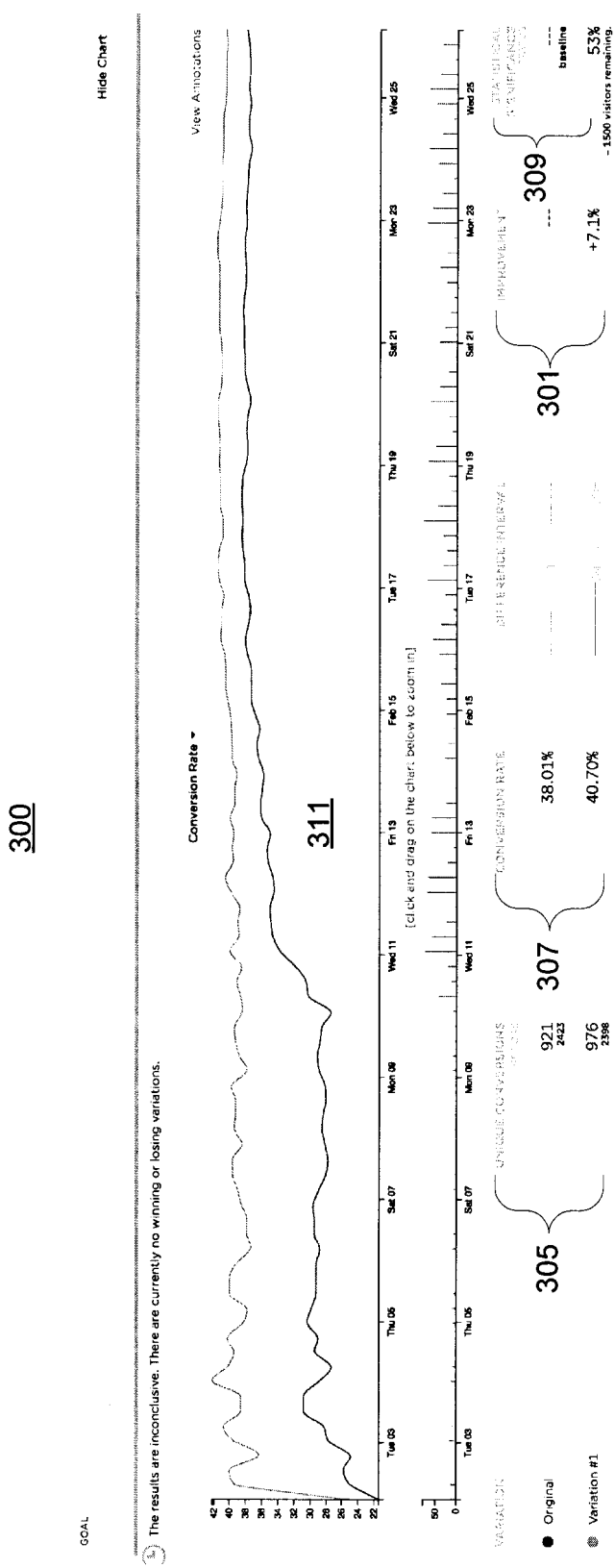
FIG. 3 is a user interface of a results page provided to an experimenter according to one embodiment.

FIG. 3 illustrates an example user interface 300 of current results of a variation test that the statistics module 121 provides to an experimenter upon request. The results of the variation test conducted by the statistics module 121 include an observed improvement 301 between the variations of the web page such as the improvement of the variant of the web page compared to the control version. The results may also include the number of users that received each variation of the web page, a number of unique conversions 305 that occurred on each variation of the web page, conversion rate for each variation 307, and the statistical significance of each variation 309. The results may also include a graph indicating conversion rate of the variations over time. In one embodiment, the observed improvement 301 is calculated based on the difference between the current conversion rate and a prior calculated conversion rate divided by the prior calculated conversion rate. The prior calculated conversion rate may be the conversion rate that was calculated responsive to the most recent request for the current results of the variation test.

Generally, an experimenter runs the variation test on the web page to determine which variation provides an improvement over the control version. That is, the experimenter wants to determine the "winners" or "losers" of the variation test. A "winner" is considered a variation of the web page that shows improvement in conversion rate over the control version of the web page. Conversely, a "loser" is considered a variation of the web page that did not show improvement in conversion rate over the control version of the web page. In one embodiment, the statistics module 121 declares the results of the variation test conclusive if the difference in the conversion rates $\hat{\theta}_n$ between the variations of the web page is significantly different from zero (either positive or negative) as will be further described below.

Figure 4:
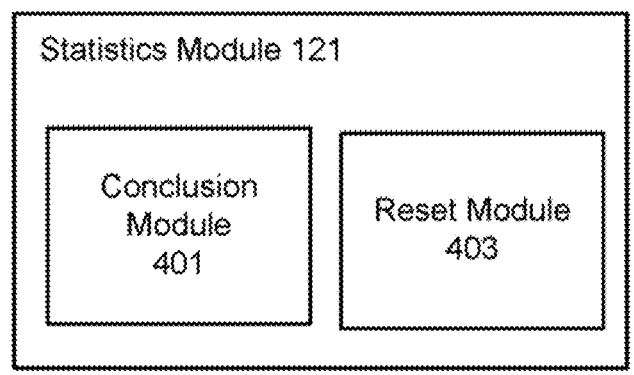
FIG. 4 is a detailed view of a statistics engine according to one embodiment.

FIG. 4 illustrates a detailed view of the statistics module 121 according to one embodiment. The statistics module 121 can have other modules than those shown in FIG. 4 in other embodiments. As shown in FIG. 4, the statistics module 121 includes a conclusion module 401. The conclusion module 401 determines the conclusion (i.e., the end) of the variation test based on the difference in the conversion rates $\hat{\theta}_n$, between the variations of the web page. In one embodiment, the conclusion module 401 determines a magnitude of the difference in conversion rates $\hat{\theta}_n$ required to deem the variation test conclusive after every user visits the web page.

After every user receives a variation of the web page, the conclusion module 401 determines the magnitude by first determining the conversion rate for each variation up to the most recent user that received the web page. In this example, assume that the distribution is evenly split so half the users n/2 receive the control version of the web page and half of the users n/2 receive the variation of the web page where n is the index of the number of users that visited the web page undergoing the variation test. The conclusion module 401 calculates the conversion rate $\hat{X}_n$ for the control version of the web page and the conversion rate $\hat{Y}_n$ for the variation of the web page.

The conclusion module 401 determines the conversion rate for each variation of the web page by calculating the quotient of the number of conversions that occurred on the variation of the web page and the total number of users that visited all variations of the web page. The conclusion module 401 then calculates the difference in the conversion rates $\hat{\theta}_n$ where $\hat{\theta}_n = \hat{Y}_n - \hat{X}_n$. The difference in the conversion rates $\hat{\theta}_n$ signifies how the variation of the web page is performing with respect to the control version of the web page in terms of conversions. Thus, a higher difference in conversion rate is indicative of increased interaction of the elements of the modified elements of the control version of the web page that are included in the variation of the web page. As mentioned above, the conclusion module 401 may calculate the difference in the conversion rates $\hat{\theta}_n$ value responsive to each user visiting the web page undergoing the variation test.

In one embodiment, the conclusion module 401 determines that the results of the variation test are conclusive based on condition (1) shown below:

$$|\hat{\theta}_n| > \sqrt{\left(2\log\left(\frac{1}{\alpha}\right) - \log\left(\frac{V_n}{V_n + \tau}\right)\right)\left(\frac{V_n(V_n + \tau)}{\tau}\right)}$$

In condition (1), $\alpha$ is a predetermined statistical significance, $\tau$ is a constant with a positive value, and $V_n$ is an estimate of the variance of the observed difference of conversion rates. In one embodiment, the value of $\alpha$ is received from the experimenter. One example value for $\alpha$ is 0.1 which controls the rate of false positives to be 10%. In one embodiment, the value for $\tau$ is set by an employee of the variation testing system 105 or the experimenter. The value of $\tau$ is selected to reflect improvements that are likely across all content providers 107 based on historical data of variation experiments conducted by the variation testing system 105. $V_n$ is the sum of the estimates of the variances of $\hat{X}_n$ and $\hat{Y}_n$ and is calculated according to the following equation.

$$V_n = \frac{2(X_n(1 - X_n) + Y_n(1 - Y_n))}{n}$$

After every user n that visits the web page, the conclusion module 401 determines the difference in the conversion rates $\hat{\theta}_n$ and determines whether condition (1) is satisfied. If the conclusion module 401 determines that the absolute value of the difference in the conversion rates $\hat{\theta}_n$ is greater than $$\sqrt{\left(2\log\left(\frac{1}{\alpha}\right) - \log\left(\frac{V_n}{V_n + \tau}\right)\right)\left(\frac{V_n(V_n + \tau)}{\tau}\right)},$$

the conclusion module 401 declares the end of the variation test. When the variation test is finished, the conclusion module 401 can declare either the control version or the variation of the web page as the "winner" of the variation test based on the observed improvement of the winner. Otherwise, the conclusion module 401 allows the variation test to continue if condition (1) is not satisfied.

Referring back to FIG. 4, in one embodiment the statistics module also includes a reset module 403. The reset module 403 resets a variation test being conducted on a web page. The reset module 403 may determine whether to reset the variation test responsive to each user visiting the web page. Resetting the variation test corrects any false positive (e.g., an inconclusive variation test declaring a winner or loser) assuming the underlying processes causing users to perform a conversion do not change. Furthermore, resetting the variation test indicates that the underlying process causing users to perform a conversion on one of the variations of the web page is changing possibly due to time variation, changing beliefs, or other exogenous factors. In one embodiment, the reset module 403 determines whether to reset the variation test after each user visits the web page based on a confidence interval.

In one embodiment, the confidence interval represents a range of difference in the conversion rates $\hat{\theta}_n$ that is likely to contain the actual improvement in the conversion rate of the variation of the web page compared to the conversion rate of the control version of the web page. For example, a 90% confidence interval on the difference in conversion rates has at least a 90% chance of containing the actual difference of average conversion rates between the variation and the control version of the web page. The difference in conversion rates $\theta_n$ approaches the actual difference of average conversion rates as more users visit the web page. Thus, a difference in conversion rate $\hat{\theta}_n$ calculated from 10,000 visitors will likely be closer to the true difference than one calculated from 100 visitors and will eventually be arbitrarily close to the true average as long as the underlying process causing conversion does not change.

In one embodiment, the reset module 403 calculates the confidence interval by determining a desired level of confidence (1−α) for the variation test. In one example, the desired level of confidence (1−α) for the variation test may be received from the experimenter. The reset module 403 sets a range of conversion rate differences (e.g., the confidence interval) equal to $$\hat{\theta}_n \pm \sqrt{\left(2 \log\left(\frac{1}{\alpha}\right) - \log\left(\frac{V_n}{V_n + \tau}\right)\right)\left(\frac{V_n(V_n + \tau)}{\tau}\right)},$$

to calculate the confidence interval. The results of the calculation include the bounds of the confidence interval that are associated with the desired level of confidence (1−α). For example, the resulting calculation may result in a 3% to 7% conversation rate difference. In one embodiment, the reset module 403 identifies the intersection of the confidence interval and the confidence interval at (n−1) visitors to determine the confidence interval for n visitors.

In one embodiment, after receiving an indication of each user that visits the web page, the reset module 403 compares the difference in conversion rate $\hat{\theta}_n$ calculated for all users up to the most recent user to the confidence interval. The reset module 403 allows the variation test to continue if the comparison indicates that the difference in conversion rate $\hat{\theta}_n$ is within the confidence interval for the variation test. Thus, the reset module 403 takes no further action. However, if the reset module 403 determines that the difference in conversion rate $\hat{\theta}_n$ is not within the confidence interval, the reset module 301 resets the variation test for the web page.

In one embodiment, resetting the variation test for the web page restarts the beginning of the variation test to the time when the reset occurred. By resetting the variation test, the reset module 403 disregards all of the accumulated conversion rate difference values $\hat{\theta}_n$ for the users that visited the web page up to when the reset is implemented. In one embodiment, after a threshold number of users visit the web page (e.g., 100), the reset module 403 calculates a new confidence interval. Thus, after the variation test is reset, the reset module 403 compares the difference in conversion rate value $\hat{\theta}_n$ for any subsequent users that visit the web page to the new confidence interval to determine whether another reset is warranted.

Furthermore, the reset module 403 also re-calculates the magnitude of the difference in the conversion rates $\hat{\theta}_n$ between the variations of the web page required to deem the variation test conclusive according to condition (1). In one embodiment, after receiving an indication of each user that visits the web page, the reset module 403 also determines whether condition (1) is satisfied. If condition (1) is satisfied, a winner of the variation test is declared as described above. Further details of the reset module 403 is described below.

Providing Variations of Web Pages

Figure 5:
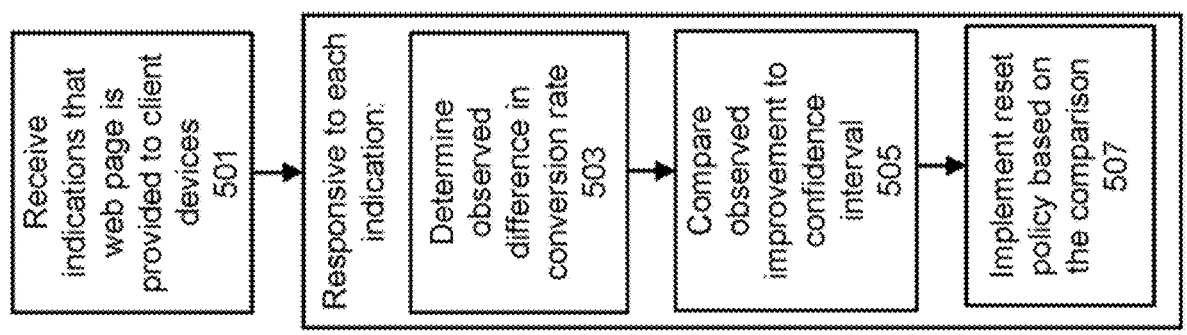
FIG. 5 is a method flow diagram for implementing a variation test according to one embodiment.

FIG. 5 is a method flow diagram of a process for implementing a variation test according to one embodiment. In different embodiments, other steps may be performed other than those shown in FIG. 5.

In one embodiment, the variation testing system 105 receives 501 indications from a content provider 107 that a web page is provided to a plurality of client devices 102. The web page provided to each of the client devices 102 is one of a plurality of variations of the web page. Responsive to each indication, the variation testing system 105 determines 503 an observed difference in conversion rates $\hat{\theta}_n$ between the variations of the web page. The variation testing system 105 compares 505 the observed difference in conversion rates $\hat{\theta}_n$ to a confidence interval. The confidence interval represents a range of $\hat{\theta}_n$ values indicative that there is an actual improvement in the conversion rate of a variation of the web page compared to the conversation rate of another variation of the web page. The variation testing system 105 implements 507 a reset policy based on the comparison. In one embodiment, if the observed difference in conversion rates $\hat{\theta}_n$ is outside of the confidence interval, the variation testing system 105 implements the rest policy.

Further Details of the Statistics Module 121

A Type I error, or false positive, occurs when a statistical decision procedure rejects the null hypothesis, even though the null hypothesis was true, i.e., where there is no difference between the treatment and control groups. The Type I error rate is the frequency with which such errors are made on true null hypotheses; in other words, how often do we declare a result significant on an A/A test. For example, if a procedure has a 10% Type 1 error rate, then about 1 detection in 10 A/A tests is expected, 2 in 20, 5 in 50, and so on. Type I error rate is a key statistical measurement, and indeed it is the underpinning of any valid statistical decision procedure.

Power is the probability that an A/B test with a true difference between treatment and control will be declared significant, and called in the right direction. Since decision procedures based on data all have underlying uncertainty, requiring zero chance of a Type I error, also means zero power because no tests can ever be called significant. Conversely, having 100% power also means 100% Type I error, since all tests must lead to significant detections. In general, the experimenter trades off one against the other: increasing power brings with it increasing Type I error rate, and "good" statistical procedures are those that yield relatively high power while maintaining a reasonably low Type I error rate. For example, most A/B testing platforms suggest controlling Type I error rate at around 5-10%, and choosing a sample size to ensure statistical power is at least 80%.

The statistics module 121 is designed to better match the way experimenters use the platform, while still providing both control of statistical error and good power. The statistics module 121 includes two innovations in particular: sequential hypothesis testing, and control of false discovery rate for multiple hypothesis testing.

Continuous Monitoring and Sequential Testing

In traditional statistics used in A/B testing such as fixed-horizon statistics; it presumes that a sample size is fixed in advance. In such contexts, fixed-horizon statistics is optimal in the following sense: given a bound on the proportion of false positives, the probability of detecting any true effect with the predetermined data set is maximized, irrespective of the size of that effect.

For modern A/B testing the logistical constraints fall away, and with the detailed real-time data we have now it should be possible to do much better. One of the greatest benefits of advances in information technology, computational power, and visualization is precisely the fact that experimenters can watch experiments in progress, with greater granularity and insight over time than ever before. A key goal of the statistics module 121 is to take advantage of this opportunity with a novel statistical approach.

How can we take advantage of real-time data? Note that there is a subtlety in the optimality property of fixed-horizon statistics described above: while the power (probability of detection) is maximized for any true effect, the power can still be very low if the effect is small compared with the sample size. To have adequate power for detecting small effects, the experimenter commits to a large sample size up front, and this will be wasted effort if it turns out the true effect could have reliably been detected much sooner.

When a sample size need not be set in advance, the data should let you learn the size of the effects to consider adaptively, and so optimize the sample size at which the test terminates. But fixed-horizon statistics offers no mechanism for mid-experiment optimization, so unfortunately the additional flexibility of A/B testing has so far only been considered detrimental, driving up the number of false positives if you are not savvy.

Generally, continuous monitoring of an experiment increases the Type I error rate when fixed-horizon statistics is used, whereas the statistics engine 121 leverages real-time data correctly through a framework known as sequential testing.

Statistical Decision Procedures, Continuous Monitoring, and Decision Boundaries

For convenience we will just consider a binary goal, although the discussion is essentially the same for real-valued goals. Assume a web page includes only a baseline (the "control") and a single variation (the "treatment"). In one embodiment, n is used to index the number of visitors that have arrived. Further assume the allocation is evenly split so that n/2 visitors are in the baseline and variation as mentioned above; all the discussion below is equally valid (just with more notation) even if the allocation is unequal. For the rest of the discussion herein, $\overline{X}_n, \overline{Y}_n$ represents the current observed conversion rate for the baseline and the variation respectively. Finally, the key quantity of interest to us is the difference of these conversion rates, $$\hat{\theta}_n = \overline{Y}_n - \overline{X}_n.$$

The statistics module 121 runs A/B tests for content providers 107 to learn which variations are winners (and which are losers). Intuitively, this means results should be declared conclusive if $\hat{\theta}_n$ is "significantly" different from zero (either positive or negative). In other words, we can think of a statistical decision procedure as telling us how large the magnitude of $\hat{\theta}_n$ needs to be for results to be conclusive. A classical result in statistics (the Sufficiency Principle) tells us that all good decision procedures have this form.

To see this approach in action, consider fixed-horizon statistics. If a sample size of n is established, then fixed-horizon statistics would tell you that the test is conclusive at a given level α (e.g. 5%) if $$|\hat{\theta}_n| > k\sqrt{V_n},\qquad(1)$$
$$V_n = \frac{2(\overline{X}_n(1-\overline{X}_n) + \overline{Y}_n(1-\overline{Y}_n))}{n}$$

where:
and k is a fixed constant.

Note that for binary goals, $V_n$ is an estimate of the variance of the observed difference of conversion rates; in particular, it is the sum of the estimate of the variances of $\overline{X}_n$ and $\overline{Y}_n$, respectively. Given a desired control α on Type I error probability, the constant k can be chosen to ensure that the Type I error is equal to α. There is a fundamental tradeoff here: if k is high, we are less likely to declare a result significant; this means we have a lower rate of Type I error (false positives), but at the expense of lower statistical power (detection of true effects).

Fixed-horizon statistics ensures that Type I error is controlled under the assumption that the experimenter only looks at the data once. However, if rather than setting the sample size in advance, the experiment is continuously monitored as it is running, there are many potential decision points. When viewing a test through the lens of continuous monitoring, it's useful to visualize the decision boundary of a procedure. For example, if a test is stopped the first time that (1) is satisfied, the decision boundary as a function of n is the right hand side of (1).

Why does Continuous Monitoring Inflate Type I Error?

A key point is that continuous monitoring of fixed-horizon statistics severely inflates Type I errors, losing signal about truly significant results in a sea of false positives. Suppose that the experimenter were to stop the first time that constraint (1) is satisfied. Such a rule is guaranteed to report a false positive; in other words, the test will eventually cross the decision boundary under the null hypothesis of no difference between baseline and variation. To see why, note that as n→∞, the right-hand side of constraint (1) is approximately proportional to $1/\sqrt{n}$. However, it can be shown that under the null hypothesis, the largest fluctuations of $\hat{\theta}_n$ are approximately proportional to $\sqrt{(\log\log n)/n}$; this is known as "the law of the iterated logarithm". Precisely, under the null hypothesis, this law implies that with probability one, there exist arbitrarily large values of n for which $$|\hat{\theta}_n| > \sqrt{\frac{\log\log n}{n}}.$$

The right hand side is guaranteed to eventually exceed any threshold that is proportional to $1/\sqrt{n}$; in particular, it is guaranteed to exceed the decision boundary on the right hand side of (1), so the Type I error rate of such a rule is 100%!

In practice, the Type I error of such a rule is somewhat lower because the experimenter doesn't wait indefinitely. Even so, with reasonable sample sizes, it is typically the case that Type I error rate will exceed 70-80%. It's clear from the preceding decision that becoming more conservative (i.e., using a higher constant k in constraint (1)) doesn't work, because regardless of the value of k the law of the iterated logarithm says the decision boundary will eventually be crossed.

Towards a Solution

Our goal is to let the experimenter make decisions as soon as possible. However, naive continuous monitoring can lead to spurious decisions—ones based on chance trends in experimental data—overwhelming good ones.

The previous section illustrates the problem: while a decision boundary that scales like $1/\sqrt{n}$ works when we look only at a single point in time, it does not prevent the sample path of $\hat{\theta}_n$ under the null hypothesis from crossing at any point in time. This is what causes the spike in Type I error with continuous monitoring: eventually, $\hat{\theta}_n$ will cross the decision boundary. What is needed is a decision boundary that ensures the probability that $\hat{\theta}_n$ ever crosses is controlled at a desired level α.

One way of choosing such a boundary is to choose a very large constant C, and only stop if $|\hat{\theta}_n| > C$. This will indeed lead to a very low Type I error, since the chance of $|\hat{\theta}_n|$ crossing a fixed large value under the null hypothesis can be made arbitrarily low. The problem, of course, is that this probability will also be low even if there really is a difference—in other words, the statistical power of such a boundary will be terrible. What the statistics module 121 strives to ensure is detecting an effect if one really exists. Note that if the true conversion rate difference is non-zero, $|\hat{\theta}_n|$ will converge to this true value, so a decision boundary that converges to zero as n→∞ is needed. Such a boundary is guaranteed to be crossed when the effect is nonzero; in fact, the faster such a boundary converges to zero, the faster we will detect true effects—at the expense of a potentially inflated Type I error rate.

A problem is identifying a decision boundary that converges to zero quickly (so that true effects are detected fast), but is not crossed too often under the null hypothesis (so that Type I error is controlled)? A clue to the solution is from the law of the iterated logarithm. $|\vec{\theta}_n|$ will cross $\sqrt{(\log\log n)/n}$ infinitely often, a boundary is needed that goes to zero slower than this. However, a boundary that goes to zero as fast as possible is also needed.

The statistics module 121 uses a boundary proportional to $\log\sqrt{\log n/n}$. This boundary goes to zero as n→∞, so that all true effects are detected. But it doesn't do so overly quickly, so that Type I error can be controlled.

Formally, suppose that the experimenter has fixed a desired bound a on Type I error. With the statistics module 121, the test is deemed conclusive once the following condition holds:

$$|\hat{\theta}_n| > \sqrt{\left(2\log\left(\frac{1}{\alpha}\right) - \log\left(\frac{V_n}{V_n + \tau}\right)\right)\left(\frac{V_n(V_n+\tau)}{\tau}\right)}. \quad (2)$$

First, note that $V_n$ scales approximately proportionally to 1/n for large n. Note that the right hand side is approximately proportional to $\sqrt{\log n/n}$ for large n.

Second, note that there is a constant r that determines the exact decision boundary. This constant is a free parameter, in the sense that regardless of the value of τ (as long as it is positive), the resulting test gives valid Type I error control while ensuring any true nonzero effect will eventually be detected. However, careful tuning of τ can have a significant effect on the speed of detection of true effects.

The Technical Appendix below details the derivation of constraint (2) further, but the idea for the boundary can be summarized as follows. The key is to consider a likelihood ratio test. In particular, fix a positive θ; the likelihood ratio (LR) given the data so far is the ratio of the probability of seeing the data if the true difference were θ, to the probability of seeing the data if the true difference were zero. When the LR is large, it means that the true effect of θ is more likely than the null hypothesis of zero difference. As a result, we can consider a simple rule: stop if the LR ever crosses a fixed threshold. Prior results in sequential testing have shown that this test (with an appropriate choice of fixed threshold) has the desired properties, if we knew in advance the only possible value of a true effect is θ. This test is known as the Sequential Probability Ratio Test (SPRT).

Unfortunately, in practice, the true effect θ is unknown. Of course, w prior knowledge about what kinds of effects might be "reasonable" to see are available, and so a natural approach in this case is to put a prior distribution on θ. Formally, the statistics module 121 computes the average LR against a prior distribution on the true effect θ, and wait to see if this average LR ever crosses a fixed threshold. This test (rewritten) is exactly the test described in (2).

The prior lets us focus on the effect sizes we most anticipate, and the test is optimized for fast detection on θ where the prior is large, i.e., for those effects we are likely to observe. For the normal prior, this is controlled by the parameter τ. We chose our prior, and hence the parameter τ, as the result of extensive analysis of historical experiments run on the statistics module 121.

Statistical Significance

In classical statistics, the significance level is closely related to the p-value. Informally, the p-value reports the chance of seeing the observed data, if the null hypothesis were true; the significance level is one minus the p-value. In other words, a high significance level suggests it is safe to declare a test as conclusive.

There is a straightforward way to obtain p-values from a decision rule like the one in constraint (2). In particular, we define the p-value after n visitors to be the least α such that the threshold has already been crossed. Under the null hypothesis, the chance of ever crossing the threshold in (2) is α. With this definition, this property guarantees that the chance the p-value ever drops below α is no larger than α.

In practice, regardless of when an experimenter chooses to look at the experiment, the experimenter is guaranteed that the test is stopped when the p-value is below α (i.e., your statistical significance is above 1−α), the Type I error rate will be no more than α. The control on false positives is controlled, while still making it possible to stop tests as quickly as possible when the data justifies it (giving good statistical power). This balancing of dual goals is what makes sequential testing so powerful.

Multiple Hypothesis Testing and Controlling False Discovery Rate

The second key challenge of the statistics module 121 is making it easier for content providers 107 to include multiple goals and variations, and confidently interpret the results. While controlling Type I error is a fundamental aspect of nearly all statistical decision procedures, there is a significant pitfall to be aware of as the number of simultaneous tests increases: controlling Type I error rate does not lead to actionable insight as the number of tests increases. What are False Discovery Rates?

False discovery rate (FDR) is a different measurement designed to address the issues with reporting Type 1 error while running many concurrent experiments. It is defined as the expected proportion of false detections among all detections made:

$$FDR = E\left[\frac{V}{R \vee 1}\right], \quad (3)$$

where V is the number of tests declared significant which were truly null (i.e., effectively like A/A tests), and R counts the overall number of tests declared significant. The convention is to take V/R=0 if no rejections were made (R=0), as denoted by the V sign for maximum.

Does Controlling the False Discovery Rate Lead to Actionable Insight?

To understand why FDR is useful in a business decision making context, a comparison is made on how the decision maker might react to seeing, say, 5 conclusive tests (winners and losers combined). If all that is known is that the decision procedure controlled Type I error, then the number of other tests run is very important: if 50 other tests were run, these 5 may be highly likely to be conclusive by random chance alone; but if only 5 other tests were run, then the decision maker may become more confident the 5 conclusive results are meaningful. In other words, the number of other inconclusive tests affects whether the decision maker believes her results are actionable.

This consequence is eliminated with procedures that control FDR. Reporting a set of A/B Tests with, for example, "false discovery rate less than 10%" is completely actionable without knowing anything about non-significant variations. The statement means that at least 90% of the reported results have a true difference between variation and baseline.

Why are FDR estimates more actionable with multiple A/B tests? Mathematically, the main observation is that FDR reverses the conditional probability that defines Type I error. In classical statistics, a p-value reports estimates of the probability of the data given there is no difference between baseline and variation. False discovery rates reverse this conditional probability: in particular, FDR is an estimate of the probability of no difference (or a false detection) between the baseline and variation, given the data you observed.

The questions from before are exactly answered by only reporting conclusive results where FDR is less than a threshold, say 10%. Note that 1−FDR is an estimate of the chance there is a true difference between baseline and variation, given the data observed.

In fact, it is possible to further put an ordering on the significance level of significant A/B tests. If we have a group of conclusive results when we control FDR at 10%, and a (smaller) conclusive subset of results when we control FDR at 1%, we can say that the whole group of significant results is 90% likely to give you actual lift when implemented, while the smaller group is 99% likely. Risk trade-offs guide a consumer of these results to make judgments on which variations to implement or further investigate.

It is for these reasons that the statistics module 121 reports significance as 1−FDR for each A/B test.

Why does FDR Control Work?

The relationship between FDR control and the conditional probability is as follows:

$$P(\theta = 0 \mid \hat{\theta}_n)$$

using the notation from section 2.1. $\hat{\theta}_n$ is used as short-hand for "all observed data required for the statistical decision procedure at hand." In particular, it may now also depend on quantities like $V_n$. We can use the definition of conditional probability to write $$P(\theta = 0 \mid \hat{\theta}_n) = \frac{P(\theta = 0 \cap \hat{\theta}_n)}{P(\hat{\theta}_n)} = \frac{P(\theta = 0)P(\hat{\theta}_n \mid \theta = 0)}{P(\hat{\theta}_n)}$$

A (empirical) Bayesian perspective on false discovery rate control is that we try to estimate the three quantities on the right of the equals sign to get an estimate of the conditional probability on the left. Then all hypotheses with an estimate lower than a pre-specified threshold are reported.

There are three steps. First, notice that $\hat{p}=P(\hat{\theta}_n \mid \theta=0)$ is simply the Type 1 error, or p-value, and we have those for each A/B test. Next assume that there is an unobserved prior proportion, $\pi_0$, of null tests (no true difference).

Finally, the words data, observed difference, and p-value interchangeably. This is because a p-value is the amount of evidence collected against a null hypothesis of no true difference in conversion rates ($\theta=0$). Smaller p-values denote more evidence against the null hypothesis so $$P(\hat{\theta}_n) = P(p \leq \hat{p})$$

where $\hat{p}=\hat{p}(\hat{\theta}_n)$ is the p-value as a function of $\hat{\theta}_n$, and this probability is computed over all tests, whether $\theta=0$ or not. The unbiased, maximum likelihood estimate of this probability is just the number of boxes with p-values as small as the p-value of the test, divided by the number of boxes in the matrix (N). Or, if we order the A/B tests by their p-values, from smallest to largest, then $$P(\theta = 0 \mid \hat{\theta}_{n,i}) = P(\theta = 0 \mid \hat{p}_i) = \frac{\pi_0 \hat{p}_i}{i/N} \qquad (4)$$

is the estimated FDR of the ith A/B test. The Benjamini-Hochberg method upper bounds $\pi_0 \leq 1$, and then rejects hypotheses based on this estimate. Since the Benjamini-Hochberg method controls the FDR described in (3), we get a duality between FDR and $P(\theta=0 \mid \vec{\theta}\, 0_n)$.

The result is a group of hypotheses, all of which are guaranteed to have both definitions of false discovery rate, (3) and (4), below a threshold. The winning and losing variations (green and red boxes) reported are those with FDR less than the value set in your project level settings. The significance value reported for each A/B tests are estimates of $$P(\theta = 0 \mid \hat{p}_i).$$

Using FDR for Confidence Intervals

Along with false discovery rate is a closely related measurement which is called false coverage rate (FCR). False coverage happens when a confidence interval (on the lift in conversion rates) does not contain the true difference between variation and baseline, $\theta$.

Intuitively, one wants a method controlling FCR to give the same guarantee as one for FDR, for example, at most 10% of significant confidence intervals do not contain the true difference. This statement seems innocuous. By definition, a marginal confidence interval on one A/B test already attains at most 10% chance of not covering the true difference, so looking at a collection of confidence intervals should similarly have at most 10% error rate of coverage. But as with false discovery rate, the danger lies in the single word significant because it encapsulates a selection procedure. The confidence intervals that end up being reported are not on a random selection of A/B tests, but on a specific subset of A/B tests—the ones that had high significance values. This selective action by the experimenter changes the coverage rate.

As a simple example, suppose we use the selection procedure—"only report a confidence interval if it doesn't contain 0." Then no matter what coverage level the marginal confidence interval had, it now has exactly 0 chance of covering the true difference between variation and baseline when it is 0.

One procedure that guarantees FCR control regardless of the selection procedure is to require that at most 10% of all confidence intervals do not contain the true difference, and is achieved by reporting 1−q/N confidence intervals where q is the desired error rate and N the number of A/B tests. This is too stringent for the same reason that thresholding the chance of at most 1 false detection is. The FCR is then controlled too well in the sense that FCR is closer to 0 than q and so confidence intervals are too wide.

On the other hand, FCR should be controlled at the very least on all winners and losers. This led to the definition of a FCR controlling procedure which reports 1−qm/N confidence intervals (m is the number of significant variations). This lower bounds the proportion of false coverage by q/2 and has confidence intervals which do not contain 0 exactly when they are winners and losers by the FDR thresholding procedure.

Extending FCR to an A/B testing platform means that FCR should also be controlled on the test currently visible on a user's dashboard, regardless of its significance. The act of viewing an A/B test must mean that it is a candidate in an experimenter's selection procedure. Similarly, unobserved and non-significant A/B tests cannot be because we stipulate that a current significance level must be observed for selection.

To this end, we implement the following procedure for generating confidence intervals with FCR controlled at level q: for the ith box, report a standard confidence interval using the following altered nominal coverage levels if the result is significant, set coverage level to $$1 = q\frac{m}{N}$$

if the result is not significant, set coverage level to $$1 - q\frac{m+1}{N}.$$

where: m is the number of conclusive results after applying a method to control FDR at threshold q.

This procedure has FCR control on precisely the confidence intervals of the set of results with estimated FDR below a threshold, and, in addition, the confidence interval currently viewed by the user, regardless of its significance.

Our modification shows another fundamental difference between online experimentation and classical hypothesis testing. An experimenters behavior may be directly observed during the test, and this observed behavior can be directly incorporated into inferential guarantees.

Does FDR Control Work with Sequential Testing?

The sequential testing described herein is designed to commute with applying the Benjamini-Hochberg procedure at every point in time, and still give the expected guarantees. In other words, $FDR_T$ is defined as the expected false discovery rate after t minutes have gone by, with t=0 being the time that the first test began, then we guarantee $$E[FDR_T] \leq q$$

with q a pre-determined threshold, and T a stopping time, or rule describing a decision to stop and look at the matrix of tests. One example of such a decision T is "report results when 5 variations x goal pairs all have FDR below 10%." As before, regardless of when you look at the matrix, if you call the tests with FDR≤q, then you are guaranteed to control false discovery rate at level q.

Technical Appendix: Sequential Testing with Likelihood Ratios

Below is the full derivation of the threshold on $\theta_n$ given in constraint (2). To do this, we change perspective from $\theta_n$ to the likelihood function. Let $X_1, X_2, \ldots$ denote the sequence of observations for visitors in the baseline group (where a one means the visitor converted, and zero means they did not); and let $Y_1, Y_2, \ldots$ denote the sequence of observations for visitors in the variation group. Given any candidate $\theta$ for the true conversion rate difference, the likelihood of $\theta$ based on the first n observations is defined as:

$$L_n(\theta, \hat{\theta}_n) = P_\theta(X_1, \ldots, X_{n/2}, Y_1, \ldots, Y_{n/2})$$

where $P_\theta$ denotes probabilities when the true difference is $\theta$, and $\tilde{\theta}_n$ is a sufficient statistic encoding all the information needed from the first n observations to calculate $L_n$. Until the end of this section, we drop the parameter $\hat{\theta}_n$ for ease of explanation, because it is not needed for the arguments here. It becomes important again in section 5, where we combine our results.

The likelihood function is a fundamental quantity that is of central importance across statistics. In any statistical model, it formalizes the plausibility of a candidate parameter value $\theta$, given the data observed.

Recall that our overall objective comprises two parts: to adaptively learn the effect size we should anticipate, and then to stop as soon as possible to detect that effect when it holds. We begin by isolating the latter goal. Suppose that we knew that the true conversion rate difference was either zero or some given non-zero alternative $\tilde{\theta}$. Then the likelihood ratio of $\tilde{\theta}$ against zero is defined as $$\Lambda_n(\tilde{\theta}) = \frac{L_n(\tilde{\theta})}{L_n(0)}$$

This represents the relative plausibility of the alternative.

At the start of the experiment $L_0(\tilde{\theta})=L_0(0)=1$ so this ratio is 1. Over the course of the experiment, the value of $\Lambda_n(\tilde{\theta})$ will fluctuate as $\theta_n$ does. In fact $\Lambda_n(\tilde{\theta})$ depends on the data only through the value of $\theta_n$ (that is the sense in which $\theta_n$ is "sufficient") so placing a threshold on $\theta_n$ is equivalent to placing a threshold on $\Lambda_n$. But unlike $\theta_n$, $\Lambda_n$ does not converge to zero when the variation and the baseline are the same. Rather, an important property of the likelihood ratio is that, if the true difference is zero, then $\Lambda_n(\tilde{\Lambda})$ is a martingale. This means that, conditional on the value $\Lambda_n$ we observe after n visitors, at a later stage m>n the expected value of $\Lambda_m$ is still $\Lambda_n$; there is no average drift upwards or downwards.

Without drift, we can get to our goal just by placing a constant threshold on $\Lambda_n$. For any positive martingale started at 1, the probability of hitting a constant threshold b>1 is less than 1/b. So the rule: stop when $\Lambda_n(\tilde{\theta}) \geq 1/\alpha$ gives always valid Type I error control at level $\alpha$.

The proof of this fact (which relies on the Optional Stopping Theorem) is roughly as follows. Let $T_b$ be the least n at which $\Lambda_n \geq b$ is achieved, with $T_b = \infty$ if the threshold is never crossed. Fix some maximum number of visitors t and let $T_b \wedge t$ be the lesser of $T_b$ and t. After $T_b \wedge t$ visitors arrive the expected value of $\Lambda_n$ is still its initial value 1. But, by construction, $$\Lambda_{T_b \wedge t} \geq \begin{cases} b & T_b \leq t \\ 0 & T_b \geq t \end{cases}$$

so $$1 = E_0 \, \Lambda_{T_b \wedge t} \geq b P_0(T_b \leq t)$$

Taking the maximum visitors $t \to \infty$ bounds the probability of ever crossing the threshold at $$P_0(T_b < \infty) \leq 1/b$$

We want to extend this approach so that the true difference can take any value. This formula is at the heart of the formulation of a sequential test as we now can control the probability that our likelihood ratio ever crosses the threshold b. It is important to note however, that a constant threshold on a single $\Lambda_n(\tilde{\theta}) \geq$ is not sufficient, because when we map back to $\theta_n$ the resulting threshold does not converge to zero. For example, while we are guaranteed to detect an effect of size B if it exists, we are not guaranteed to detect smaller effects like $\tilde{\theta}/2$ or $\tilde{\theta}/5$. The target is to consider the likelihood ratio of every potential effect $\theta$ against zero simultaneously, and hone in on the appropriate candidate. This motivates a Bayesian approach, where we place a prior, $\pi(\theta)$, on the true effect.

Then we can monitor the average likelihood ratio $$\Lambda_n(\delta_n) = \int \Lambda_n(Q) \pi(Q) dQ$$

which represents the relative plausibility of the aggregate alternative that considers every $\theta$, weighted according to $\pi(\theta)$. Again we highlight the fact that our final statistic is a function of the data $\hat{\theta}_n$. In Bayesian terminology, $\Lambda_n$ is called the Bayes factor in favor of the alternative hypothesis. Any mixture of martingales is itself a martingale (if each statistic tends to stay where it is, then so does the average). So, as before, we can get an always valid threshold on $\hat{\theta}_n$ by placing a constant threshold of $1/\alpha$ on $\Lambda_n$.

We choose a normal prior $$\pi(\theta) \sim N(0, \tau)$$

both for computational convenience and because central limiting arguments make the distribution of effect sizes effectively normal for experiments run on any even moderately popular AB testing platform.

Using this prior and integrating, we obtain the boundary in (2).

Given thresholds, it is easy to convert these tests into p-values. A p-value is the most conservative significance level at which the test is conclusive, so we take the p-value after n visitors to be the least $\alpha$ such that the threshold has already been crossed. As the experiment progresses, more thresholds are crossed and the p-value decreases, approaching some asymptotic value at $n=\infty$. In terms of p-values, the statement that the probability that the $\alpha$-level test is ever conclusive is $\alpha$ is equivalent to saying that the asymptotic p-values are uniformly distributed. So, at $n=\infty$ the p-values are as aggressive as they can be, while still controlling Type I error. However during the experiment, the p-value is an overestimate of this asymptotic p-value so we are slightly more conservative: this can be considered the mathematical penalty we must pay to be free to stop tests as early as possible.

REFERENCE APPENDIX

Traditional, fixed-horizon statistics
$\hat{p}=p(\hat{\theta}_n, \theta')$, traditional p-value for evidence against the null hypothesis, $H_0: \theta=\theta'$
$C(\hat{\theta}_n, \alpha)=\{\theta | p(\hat{\theta}_n, \theta) \geq \alpha\}$, traditional confidence interval with $1-\alpha$ coverage level
Statistics module 121 statistics
$\Lambda(\hat{\theta}_n)$, average likelihood ratio; inverse of new p*-value $$q^*(\hat{\theta}_n) = BHQ^*\left(\frac{1}{\Lambda(\hat{\theta}_n)}\right),$$

FDR-adjusted p*-value
$C^*(\hat{\theta}_n, \alpha)=\{\theta | \Lambda(\hat{\theta}_n) < 1/\alpha\}$, new confidence interval with $1-\alpha$ coverage
$Q^*(\hat{\theta}_n, \alpha)=C^*(\hat{\theta}_n, FCR(\alpha))$, FCR-adjusted coverage interval
Shown on results
$q^*(\hat{\theta}_n)$, as "Statistical Significance"
$Q^*(\hat{\theta}_n, \alpha)$, as numerical and graphical coverage interval
$\alpha$, threshold for declaring winners ($\hat{\theta}_n > 0$) and losers ($\hat{\theta}_n < 0$), by $q(\hat{\theta}_n) < \alpha$, set in account level settings
Further Details of the Reset Module 403
A reset of a variation test simultaneously performs two functions:
1. To eventually correct any false positive (an inconclusive variation test erroneously called a winner or loser) assuming the underlying processes causing visitors to convert do not change; and
2. To indicate that the underlying process, possibly due to time variation, changing beliefs, or other exogenous factors, causing visitors to convert is changing.

A confidence interval is a range of values that is likely to contain the true, or underlying value as mentioned above. For example a 90% confidence interval on the difference in conversion rates is a range of values, say $CI(:9)=[c1;c2]$, that has at least a 90% chance of containing the actual difference of average conversion rates between variation and baseline, call them $r_v$, and $r_b$. In mathematical notation, $$Prob(c_1 \leq r_v - r_b \leq c_2) \geq .9.$$

The confidence interval is intimately linked to statistical significance by the following statement: the statistical significance of a test crosses an $\alpha$ threshold at exactly the same time that an $\alpha$ confidence interval no longer contains 0.

The other fact used is that the observed conversion rate difference will get closer and closer to the actual difference of average conversation rates as more visitors enter a test. A conversion rate difference calculated from 10,000 visitors will likely be closer to the true difference than one calculated from 100 visitors and will eventually be arbitrarily close to the true average, as long as the underlying process causing conversion does not change.

For the first function of a rest, by setting a significance threshold of α=0.9 for example, no more than 10% of tests with no underlying difference are mistaken as erroneous winners or losers, due to chance variation–a false positive. Being in one of these 10% of tests means that our statistical significance rose above 90%, which in turn means that the corresponding 90% confidence interval no longer contained 0 conversion rate difference (fact 1). Furthermore, it is understood that the true difference is indeed 0 (no underlying difference) and so the observed conversion rate will eventually come arbitrarily close to 0 (fact 2). Hence, the observed conversion rate will eventually leave the confidence interval and not return, indicating that a test is currently being run that is falsely positive.

The second function is conceptually very similar. The confidence interval will eventually contain the observed difference in conversion rates α percent of the time, regardless of the size of the actual difference, as long as the underlying process does not change. So if the observed difference leaves the confidence interval, and stays outside the confidence interval, a conclusion is made that either we are in 1−α percent of tests where chance variation caused us to calculate an erroneous confidence interval, or the underlying process causing visitors to convert changed.

The reset policy is implemented by taking the canonical definition of a confidence interval described above, applying it to a sequential variation test to calculate statistical significance, and monitoring for events where the observed conversion rate difference leaves the confidence interval.

An implementation of a confidence interval which agrees with the canonical definition is the intersection of all intervals found by inverting the inverse likelihood ratio calculation at successive visitors counts. Let $iL(\theta,n)$ denote the inverse likelihood ratio for a test of the null hypothesis $r_v - r_b = \theta$ with data seen up ton visitors. The inverse, $iL^{-1}(1-\alpha,n)$ involves either the solution to a quadratic or cubic, hence an interval of possible values of θ. The confidence interval at N visitors is then implemented by:

$$CI(\alpha,N) = \bigcap_{n=1}^{N} iL^{-1}(1-\alpha,n).$$

This intersection corresponds mathematically to the minimization taken in the calculation of significance:

$$p_N = \min_{n=1}^{N} IL(0, n).$$

A reset is triggered once the observed conversion rate difference is no longer contained in the confidence interval. For example if $x_v$ and $x_b$ denote the observed conversion rates, a reset is triggered when:

$$x_v - x_b \notin CI(\alpha,N).$$

A reset is acted upon by removing the intersection in the confidence interval, and similarly the minimization in significance calculations:

$$CI(\alpha,N) = iL^{-1}(1-\alpha,N); p_N = iL(0,N).$$

Finally, a version of the above procedure is implemented to properly account for multiple testing corrections. Since multiple testing corrections cause on test's significance calculation to be impacted by other tests, and a triggered reset causes an update in significance calculations, it may be that one test's reset triggers an update in another test's significance calculation. It is likely true that the rest—significance update loop cannot persist for more than a single cycle.

In one embodiment, a full implementation of the reset policy, confidence interval calculations and multiple testing updates will have complexity upper bounded by the following:

$$2(2N+N(N+1)/2)K$$

Where N is the number of visitors, or time points to calculate results, and K is the number of tests.

The implementation is a less computationally intensive version which opts for a more conservative definition of a confidence interval as the intersection of the current inverse likelihood ration and the one at the time the minimum significance was attained, $$CI(\alpha,N) = iL^{-1}(1-\alpha,N) \cap iL^{-1}(1-\alpha,n^*)$$

Where n* is the visitor count at which $p_N$ attained its minimum. This definition still preserves all properties of the confidence interval. An implementation of this simplified confidence interval, along with the reset policy and multiple testing updates is 6NK.

Additional Considerations

The foregoing described embodiments have been presented for the purpose of illustration; they are not intended to be exhaustive or to limiting to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, described modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include one or more general-purpose computing devices selectively activated or reconfigured by one or more stored computer programs. A computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Described embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method of conducting an experiment, the method comprising:
   receiving a first plurality of indications of user interactions associated with a content item and a variation of the content item that is distinct from the content item, wherein a first plurality of client devices received either the content item or the variation of the content item from a content provider;
   upon receiving a corresponding indication for each client device of the first plurality of client devices interacting with the content item or the variation of the content item, calculating a first difference in conversion rate of the user conversions between the content item and the variation of the content item based on the received first plurality of indications of user conversions;
   determining results of the experiment based on a first conversion rate associated with user conversions of the content item and a second conversion rate associated with user conversions of the variation of the content item;
   determining a confidence interval for the results of the experiment does not contain zero; and
   in response to determining the confidence interval for the results of the experiment does not contain zero, providing the results of the experiment to the client device and an indication that the results are statistically significant.

2. The computer-implemented method of claim 1, further comprising:
   before receiving the first plurality of indications of user interactions associated with the content item and the variation of the content item, receiving a second plurality of indications of user conversions associated with the content item and the variation of the content item, wherein a second plurality of client devices received either the content item or the variation of the content item from the content provider;
   upon receiving a corresponding indication for each client device of the second plurality of client devices interacting with the content item or the variation of the content item, calculating a second difference in conversion rate of the user conversions between the content item and the variation of the content item based on the received second plurality of indications of user conversions;
   determining, after each of the user conversions, whether the second difference in the conversion rate of the user conversions is within a second confidence interval, wherein determining that the second difference in the conversion rate is not within the second confidence interval causes the experiment to reset.

3. The computer-implemented method of claim 1, wherein the variation of the content item includes one or more modifications to elements of the content item.

4. The computer-implemented method of claim 3, wherein the first difference in the conversion rate of user conversions indicates performance of the content item with respect to the variation of the content item, and wherein the performance indicates increased conversions with the modified elements of the variation of the content item that are included in the variation of the content item.

5. The computer-implemented method of claim 4, further comprising:
   determining a magnitude of the first difference in the conversion rate of user conversions between the content item and the variation of the content item that is required to deem the experiment conclusive.

6. The computer-implemented method of claim 2, further comprising resetting the experiment, wherein resetting the experiment comprises:
   responsive to causing the experiment to reset:
      calculating a third confidence interval based on user conversions with the content item and the variation of the content item that occurred after the experiment was reset; and
      calculating an updated magnitude of difference in conversion rate of user conversions between the content item and the variation of the content item that is required to deem the experiment conclusive after the reset.

7. The computer-implemented method of claim 1, wherein the results of the experiment comprises at least one of a statistical significance of the experiment, a conversion rate associated with the content item and a conversion rate associated with the variation of the content item, a comparison between the conversion rate associated with the content item and the conversion rate associated with the variation of the content item, a number of users that received the content item and a number of users that received the variation of the content item, a total number of conversions associated with the content item and a total number of conversions associated with the variation of the content item, or a graph illustrating the conversion rate of the content item over time and the conversion rate of the variation of the content item over time.

8. The computer-implemented method of claim 1, wherein the content item comprises one of a web page, a mobile device application, a video file, an audio file, a multimedia file, an image, a text document, or an advertisement.

9. A non-transitory computer-readable storage medium including executable code to conduct an experiment, the code when executed by a computer processor causes the computer processor to:
   receive a first plurality of indications of user interactions associated with a content item and a variation of the content item that is distinct from the content item, wherein a first plurality of client devices received either the content item or the variation of the content item from a content provider;
   upon receiving a corresponding indication for each client device of the first plurality of client devices interacting with the content item or the variation of the content item, calculate a first difference in conversion rate of the user conversions between the content item and the variation of the content item based on the received first plurality of indications of user conversions;

determine results of the experiment based on a first conversion rate associated with user conversions of the content item and a second conversion rate associated with user conversions of the variation of the content item;

determine a confidence interval for the results of the experiment does not contain zero; and in response to determining the confidence interval for the results of the experiment does not contain zero, provide the results of the experiment to the client device and an indication that the results are statistically significant.

10. The non-transitory computer-readable storage medium of claim 9, wherein the computer processor further to:

before receiving the first plurality of indications of user interactions associated with the content item and the variation of the content item, receive a second plurality of indications of user conversions associated with the content item and the variation of the content item, wherein a second plurality of client devices received either the content item or the variation of the content item from the content provider;

upon receiving a corresponding indication for each client device of the second plurality of client devices interacting with the content item or the variation of the content item, calculate a second difference in conversion rate of the user conversions between the content item and the variation of the content item based on the received second plurality of indications of user conversions;

determine, after each of the user conversions, whether the second difference in the conversion rate of the user conversions is within a second confidence interval, wherein determining that the second difference in the conversion rate is not within the second confidence interval causes the experiment to reset.

11. The non-transitory computer-readable storage medium of claim 9, wherein the variation of the content item includes one or more modifications to elements of the content item.

12. The non-transitory computer-readable storage medium of claim 11, wherein the first difference in the conversion rate of user conversions indicates performance of the content item with respect to the variation of the content item, and wherein the performance indicates increased conversions with the modified elements of the variation of the content item that are included in the variation of the content item.

13. The non-transitory computer-readable storage medium of claim 12, wherein the computer processor further to determine a magnitude of the first difference in the conversion rate of user conversions between the content item and the variation of the content item that is required to deem the experiment conclusive.

14. The non-transitory computer-readable storage medium of claim 10, wherein the computer processor further, responsive to causing the experiment to reset to:

calculate a third confidence interval based on user conversions with the content item and the variation of the content item that occurred after the experiment was reset, and calculate an updated magnitude of difference in conversion rate of user conversions between the content item and the variation of the content item that is required to deem the experiment conclusive after the reset.

15. The non-transitory computer-readable storage medium of claim 9, wherein the results of the experiment comprises at least one of a statistical significance of the experiment, a conversion rate associated with the content item and a conversion rate associated with the variation of the content item, a comparison between the conversion rate associated with the content item and the conversion rate associated with the variation of the content item, a number of users that received the content item and a number of users that received the variation of the content item, a total number of conversions associated with the content item and a total number of conversions associated with the variation of the content item, or a graph illustrating the conversion rate of the content item over time and the conversion rate of the variation of the content item over time.

16. The non-transitory computer-readable storage medium of claim 9, wherein the content item comprises one of a web page, a mobile device application, a video file, an audio file, a multimedia file, an image, a text document, or an advertisement.

17. A computer system to conduct an experiment, the computer system comprising:

a computer processor to:

receive a first plurality of indications of user interactions associated with a content item and a variation of the content item that is distinct from the content item, wherein a first plurality of client devices received either the content item or the variation of the content item from a content provider;

upon receiving a corresponding indication for each client device of the first plurality of client devices interacting with the content item or the variation of the content item, calculate a first difference in conversion rate of the user conversions between the content item and the variation of the content item based on the received first plurality of indications of user conversions;

determine results of the experiment based on a first conversion rate associated with user conversions of the content item and a second conversion rate associated with user conversions of the variation of the content item;

determine a confidence interval for the results of the experiment does not contain zero; and in response to determining the confidence interval for the results of the experiment does not contain zero, provide the results of the experiment to the client device and an indication that the results are statistically significant.

18. The computer system of claim 17, wherein the computer processor further to:

before receiving the first plurality of indications of user interactions associated with the content item and the variation of the content item, receive a second plurality of indications of user conversions associated with the content item and the variation of the content item, wherein a second plurality of client devices received either the content item or the variation of the content item from the content provider;

upon receiving a corresponding indication for each client device of the second plurality of client devices interacting with the content item or the variation of the content item, calculate a second difference in conversion rate of the user conversions between the content item and the variation of the content item based on the received second plurality of indications of user conversions;

determine, after each of the user conversions, whether the second difference in the conversion rate of the user conversions is within a second confidence interval, wherein determining that the second difference in the conversion rate is not within the second confidence interval causes the experiment to reset.

19. The computer system of claim 17, wherein the variation of the content item includes one or more modifications to elements of the content item.

20. The computer system of claim 19, wherein the first difference in the conversion rate of user conversions indicates performance of the content item with respect to the variation of the content item, and wherein the performance indicates increased conversions with the modified elements of the variation of the content item that are included in the variation of the content item.

21. The computer system of claim 20, wherein the computer processor further to determine a magnitude of the first difference in the conversion rate of user conversions between the content item and the variation of the content item that is required to deem the experiment conclusive.

22. The computer system of claim 18, wherein the computer processor further, responsive to causing the experiment to reset to:
calculate a third confidence interval based on user conversions with the content item and the variation of the content item that occurred after the experiment was reset; and
calculate an updated magnitude of difference in conversion rate of user conversions between the content item and the variation of the content item that is required to deem the experiment conclusive after the reset.

23. The computer system of claim 17, wherein the results of the experiment comprises at least one of a statistical significance of the experiment, a conversion rate associated with the content item and a conversion rate associated with the variation of the content item, a comparison between the conversion rate associated with the content item and the conversion rate associated with the variation of the content item, a number of users that received the content item and a number of users that received the variation of the content item, a total number of conversions associated with the content item and a total number of conversions associated with the variation of the content item, or a graph illustrating the conversion rate of the content item over time and the conversion rate of the variation of the content item over time.

24. The computer system of claim 17, wherein the content item comprises one of a web page, a mobile device application, a video file, an audio file, a multimedia file, an image, a text document, or an advertisement.

* * * * *